(12) United States Patent
Nagai et al.

(10) Patent No.: US 12,435,762 B2
(45) Date of Patent: Oct. 7, 2025

(54) COUPLING DEVICE AND TORSIONAL NATURAL FREQUENCY ADJUSTMENT METHOD

(71) Applicant: MITSUBISHI HEAVY INDUSTRIES ENGINE & TURBOCHARGER, LTD., Sagamihara (JP)

(72) Inventors: Naoyuki Nagai, Tokyo (JP); Nobuaki Satou, Tokyo (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 551 days.

(21) Appl. No.: 17/791,307

(22) PCT Filed: Jun. 17, 2020

(86) PCT No.: PCT/JP2020/023678
§ 371 (c)(1),
(2) Date: Jul. 7, 2022

(87) PCT Pub. No.: WO2021/171641
PCT Pub. Date: Sep. 2, 2021

(65) Prior Publication Data
US 2023/0021310 A1   Jan. 26, 2023

(30) Foreign Application Priority Data
Feb. 26, 2020   (JP) .................................. 2020-030803

(51) Int. Cl.
*F16D 3/76*      (2006.01)
*F16F 15/126*    (2006.01)
*F16F 15/32*     (2006.01)

(52) U.S. Cl.
CPC .............. *F16D 3/76* (2013.01); *F16F 15/126* (2013.01); *F16D 2300/22* (2013.01); *F16F 15/322* (2013.01)

(58) Field of Classification Search
CPC ...... F16D 3/76; F16D 2300/22; F16F 15/126; F16F 15/322
(Continued)

(56) References Cited

U.S. PATENT DOCUMENTS 3,245,229 A * 4/1966 Fadler ...................... F16D 3/14
464/91
3,719,060 A * 3/1973 Fessel ...................... F16D 3/76
464/91
(Continued)

FOREIGN PATENT DOCUMENTS

GB    606581  *  8/1948  ...................... 464/91
IT    461492  *  7/1951  ...................... 464/91
(Continued)

OTHER PUBLICATIONS

Extended European Search Report for European Application No. 20921997.1, dated May 30, 2023.
(Continued)

*Primary Examiner* — Greg Binda
(74) *Attorney, Agent, or Firm* — Birch, Stewart, Kolasch & Birch, LLP

(57) ABSTRACT

A coupling device that connects a first shaft and a second shaft that includes a primary inner ring member mounted on the first shaft, a primary outer ring member disposed on an outer circumferential side of the primary inner ring member, a primary elastic member for connecting the primary inner ring member and the primary outer ring member, a secondary inner ring member mounted on the second shaft, a secondary outer ring member disposed on an outer circum-
(Continued)

ferential side of the secondary inner ring member, a secondary elastic member for connecting the secondary inner ring member and the secondary outer ring member, and a weight attaching plate interposed between the primary outer ring member and the secondary outer ring member.

4 Claims, 8 Drawing Sheets

(58) Field of Classification Search
USPC .................................... 464/91, 180; 73/470
See application file for complete search history.

(56) References Cited

U.S. PATENT DOCUMENTS

| | | | |
|---|---|---|---|
| 5,767,403 A | * | 6/1998 | Kopp .................. G01M 1/32 73/470 |
| 9,556,929 B2 | * | 1/2017 | Hopkins ................. F16C 3/023 |
| 2012/0227536 A1 | | 9/2012 | Jewett et al. |
| 2015/0192019 A1 | | 7/2015 | Mancuso et al. |
| 2018/0269770 A1 | | 9/2018 | Powell et al. |

FOREIGN PATENT DOCUMENTS

| | | |
|---|---|---|
| JP | 60-129520 U | 8/1985 |
| JP | 2001-241508 A | 9/2001 |
| JP | 2012-191842 A | 10/2012 |
| JP | 2015-135181 A | 7/2015 |

OTHER PUBLICATIONS

European Search Report for European Application No. 20 921 997.1, dated Jul. 17, 2025.

* cited by examiner

View A-A

COUPLING DEVICE AND TORSIONAL NATURAL FREQUENCY ADJUSTMENT METHOD

TECHNICAL FIELD

The present disclosure relates to a coupling device and a torsional natural frequency adjustment method for the coupling device.

BACKGROUND

If torque (torsional moment) is applied to a rotational shaft, torsional vibration occurs in which a torsional angle of the rotational shaft changes periodically. If an angular frequency of a torque fluctuation applied to the rotational shaft approaches the torsional natural frequency of the rotational shaft, a resonance phenomenon occurs. In the case of a crank shaft of an engine, the resonance phenomenon may occur if the angular frequency of the torque fluctuation determined by a rotation speed of the engine approaches a torsional natural frequency of the crank shaft. Thus, design is carried out to avoid the resonance in a design stage, but a resonance frequency is an integral multiple of ½ of the engine rotation speed, extremely narrowing a frequency domain where the resonance phenomenon can be avoided.

Patent Documents 1 and 2 each disclose a coupling device for avoiding a resonance phenomenon by weighting a coupling part for connecting two shafts, and adjusting the torsional natural frequency of a shaft system by increasing or decreasing the number of the weights. Patent Documents 1 and 2 each describe that the coupling device can be adjusted without removing the coupling from the shaft system.

CITATION LIST

Patent Literature

Patent Document 1: JP2012-191842A
Patent Document 2: JP2015-135181A

SUMMARY

Technical Problem

In each of Patent Documents 1 and 2, an elastic coupling is not used as the coupling, the coupling has no vibration absorption capacity. Thus, when the resonance phenomenon occurs, an excessive stress may be generated in the shaft system and the shaft system may be damaged. Further, in Patent Document 1, a tuning ring having a large diameter and a large mass is used, causing problems that a large installation space is required, as well as it is not easy to replace the tuning ring with a tuning ring having a different mass and it is impossible to finely adjust the mass. In addition, a large inertial force is generated by the rotation of the shaft system, which is not suitable for a crank shaft of a high-speed engine. Patent Document 2 has a problem that a large-scale device and a space for installing the device are required around the coupling part in order to replace the weight.

The present disclosure was made in view of the above problems, and an object of the present disclosure is to propose a coupling device that easily adjusts the natural torsional frequency in order to avoid resonance with a compact configuration, in a case where an elastic coupling having a vibration absorption capacity is adopted for a coupling.

Solution to Problem

In order to achieve the above object, a first coupling device according to the present disclosure is made in view of the above-described problems and is a coupling device for connecting a first shaft and a second shaft that includes a primary inner ring member mounted on the first shaft, a primary outer ring member disposed on an outer circumferential side of the primary inner ring member, a primary elastic member for connecting the primary inner ring member and the primary outer ring member, a secondary inner ring member mounted on the second shaft, a secondary outer ring member disposed on an outer circumferential side of the secondary inner ring member, a secondary elastic member for connecting the secondary inner ring member and the secondary outer ring member, and a weight attaching plate interposed between the primary outer ring member and the secondary outer ring member, the weight attaching plate including a weight attaching portion capable of attaching and detaching an additional weight to and from the outer circumferential side of the primary outer ring member and the outer circumferential side of the secondary outer ring member.

In order to achieve the above object, a second coupling device according to the present disclosure is a coupling device for connecting a first shaft and a second shaft that includes an inner ring member mounted on the first shaft, an outer ring member mounted on the second shaft, the outer ring member being disposed on an outer circumferential side of the inner ring member, an elastic member for connecting the inner ring member and the outer ring member, an inner elastic body mounted on an inner circumferential side of the inner ring member, and an additional weight detachably supported by the inner elastic body on the inner circumferential side of the inner elastic body.

Further, a torsional natural frequency adjustment method according to the present disclosure is a torsional natural frequency adjustment method for adjusting a torsional natural frequency of a shaft system including a first shaft, a second shaft, and the coupling device that includes a measurement step of measuring the torsional natural frequency of the shaft system, an evaluation step of evaluating a resonance state of the shaft system based on a measurement result of the torsional natural frequency, and an adjustment step of adjusting the torsional natural frequency of the shaft system by attaching and detaching the additional weight according to an evaluation result of the resonance state.

Advantageous Effects

With a first coupling device and a second coupling device according to the present disclosure, in a case where an elastic coupling having a vibration absorption capacity is adopted for a coupling, no excessive stress is generated even if resonance occurs in a shaft system. Further, with a compact configuration, it is possible to easily adjust a natural torsional frequency in order to avoid resonance, and it is possible to expand an adjustment range of the natural torsional frequency. Furthermore, with a torsional natural frequency adjustment method according to the present disclosure, in addition to the above-described technical effects, it is possible to expand a change range of the torsional natural frequency.

DETAILED DESCRIPTION

Figure 1:
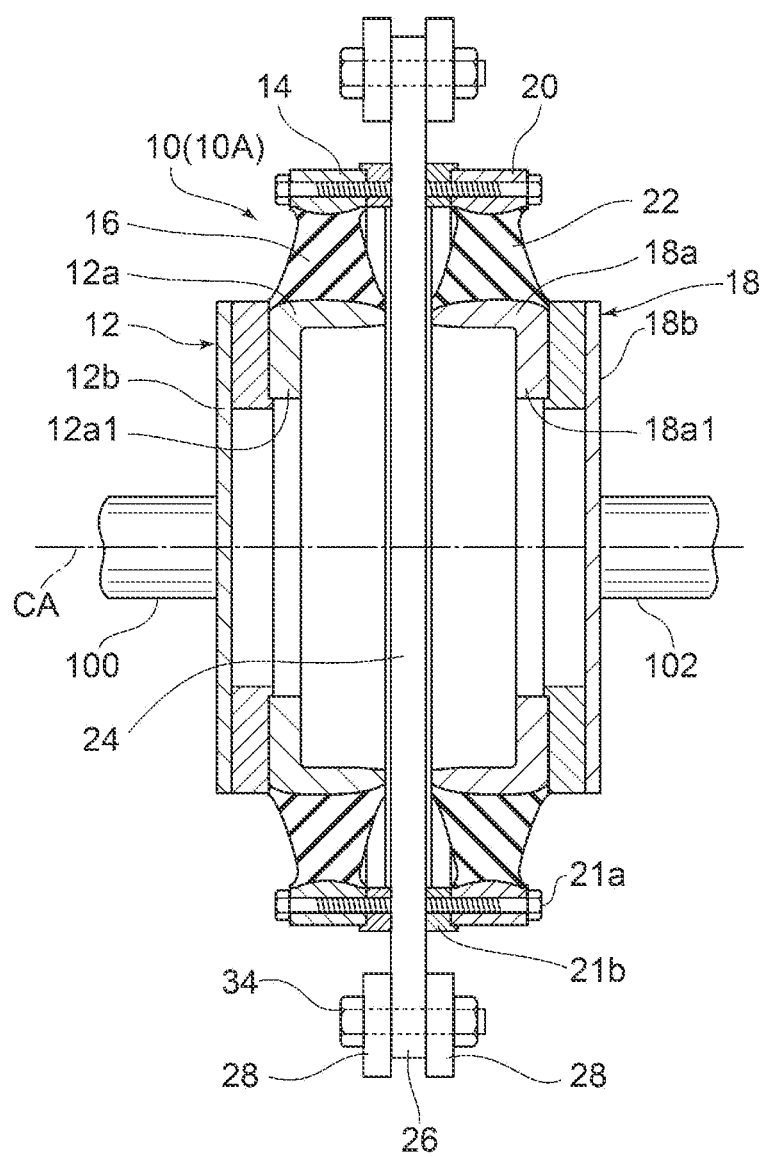
FIG. 1 is a front cross-sectional view of a coupling device according to an embodiment.

Some embodiments of the present invention will be described below with reference to the accompanying drawings. It is intended, however, that unless particularly specified, dimensions, materials, shapes, relative positions and the like of components described in the embodiments or shown in the drawings shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, an expressions such as "comprising", "including", "having", "containing", and "constituting" one constitutional element are not intended to be exclusive of other constitutional elements.

FIG. 1 is a cross-sectional view of a coupling device 10 (10A) according to an embodiment. The coupling device 10 (10A) is provided to connect a first shaft 100 and a second shaft 102. The coupling device 10 (10A) is composed of a member which is disposed between the first shaft 100 and a weight attaching plate 24 located at an axial center of the first shaft 100 or the second shaft 102, and a member disposed between the second shaft 102 and the weight attaching plate 24. A primary inner ring member 12 is mounted on a shaft end of the first shaft 100, a primary outer ring member 14 is disposed on an outer circumferential side of the primary inner ring member 12, and the primary inner ring member 12 and the primary outer ring member 14 are connected by a primary elastic member 16 disposed between these members 12 and 14.

On the other hand, on the side of the second shaft 102, a secondary inner ring member 18 is mounted on a shaft end of the second shaft 102, a secondary outer ring member 20 is disposed on an outer circumferential side of the secondary inner ring member 18, and the secondary inner ring member 18 and the secondary outer ring member 20 are connected by a secondary elastic member 22 disposed between these members 18 and 20. The weight attaching plate 24 is interposed between the primary outer ring member 14 and the secondary outer ring member 20 by these members 14 and 20. The weight attaching plate 24 includes a weight attaching portion 26 on the outer circumferential side of the primary outer ring member 14 and the secondary outer ring member 20. The weight attaching portion 26 is configured to attach and detach an additional weight 28.

When a natural torsional frequency of the first shaft 100 or the second shaft 102 and a natural torsional frequency of the coupling device 10 (10A) alone are close to each other and a resonance phenomenon may occur, the coupling device 10 (10A) adjusts the mass or the number of additional weights 28 attached to the weight attaching portion 26 to change the torsional natural frequency of the coupling device 10 (10A), making it possible to suppress the occurrence of the resonance phenomenon.

According to the above embodiment, the side of the first shaft 100 and the side of the second shaft 102 are respectively connected via the primary elastic member 16 and the secondary elastic member 22, and the weight attaching plate 24 is also connected to the side of the first shaft 100 and the side of the second shaft 102 via the primary elastic member 16 and the secondary elastic member 22, respectively. Therefore, a vibration generated in a shaft system is absorbed by the primary elastic member 16 and the secondary elastic member 22, as well as the vibration of the shaft system is damped and transmitted to the weight attaching plate 24. Therefore, no excessive stress is generated even if resonance occurs in the shaft system, making it possible to suppress damage to the shaft system. Further, since the weight attaching portion 26 formed on the weight attaching plate 24 is located on the outer circumferential side of both the outer ring members 14 and 20, the additional weight 28 is easily attached and detached without disassembling the coupling device 10 (10A), facilitating adjustment of the natural torsional frequency. Further, the additional weight 28 is disposed at a position radially away from a rotational axis of the shaft system, making it possible to generate large torque even if the mass of the additional weight 28 is small. Thus, it is possible to expand the adjustment range of the torsional natural frequency of the coupling device 10 (10A).

The primary inner ring member 12, the primary outer ring member 14, the secondary inner ring member 18, and the secondary outer ring member 20 are made of, for example, a rigid material such as metal. The primary elastic member 16 and the secondary elastic member 22 are made of an elastic material such as rubber (for example, natural rubber having self-damping property).

In an embodiment, the first shaft 100 is a crank shaft provided in an internal combustion engine (not shown), and the second shaft 102 is a rotational shaft mounted on a generator (not shown). In this case, the first shaft 100 serves as a driving shaft, and the second shaft 102 serves as a driven shaft. The rotation of the crank shaft, which is the first shaft 100, is transmitted to the rotational shaft, which is the second shaft 102, via the coupling device 10 (10A), operating the generator.

In an embodiment, as shown in FIG. 1, the primary inner ring member 12 includes a body 12a, which includes a flange portion 12a1 extending in the radial direction, at an axially one end of a cylindrical portion, and a bottom 12b fixed to the flange portion 12a1. The first shaft 100 is connected to the bottom 12b. The secondary inner ring member 18 also has the same form, and includes a body 18a, which includes a flange portion 18a1 extending in the radial direction, at the axially one end of the cylindrical portion, and a bottom 18b fixed to the flange portion 18a1. The second shaft 102 is connected to the bottom 18b.

In the exemplary embodiment shown in FIG. 1, each of the primary outer ring member 14 and the secondary outer ring member 20 having a bottomless cylindrical shape includes a bolt 21a which is screwed in a screw hole axially formed in the cylindrical body. A nut 21b is fixed to the weight attaching plate 24 at a position facing the screw hole, and the bolt 21a is screwed in the nut 21b, supporting the weight attaching plate 24 by the bolt 21a. End faces of the body 12a of the primary inner ring member 12 and the body 18a of the secondary inner ring member 18 on the side of the weight attaching plate 24 are closer to the side of the weight attaching plate 24 than end faces of the primary outer ring member 14 and the secondary outer ring member 20 on the side of the weight attaching plate 24. When the body 12a or the body 18a comes into contact with the weight attaching plate 24, a vibration absorption capacity of the primary elastic member 16 or the secondary elastic member 22 is reduced. Thus, by adjusting the amount of protrusion of the bolt 21a protruding from the nut 21b to the side of the weight attaching plate 24, it is possible to form a gap between the weight attaching plate 24 and the body 12a or the body 18a.

Figure 2:
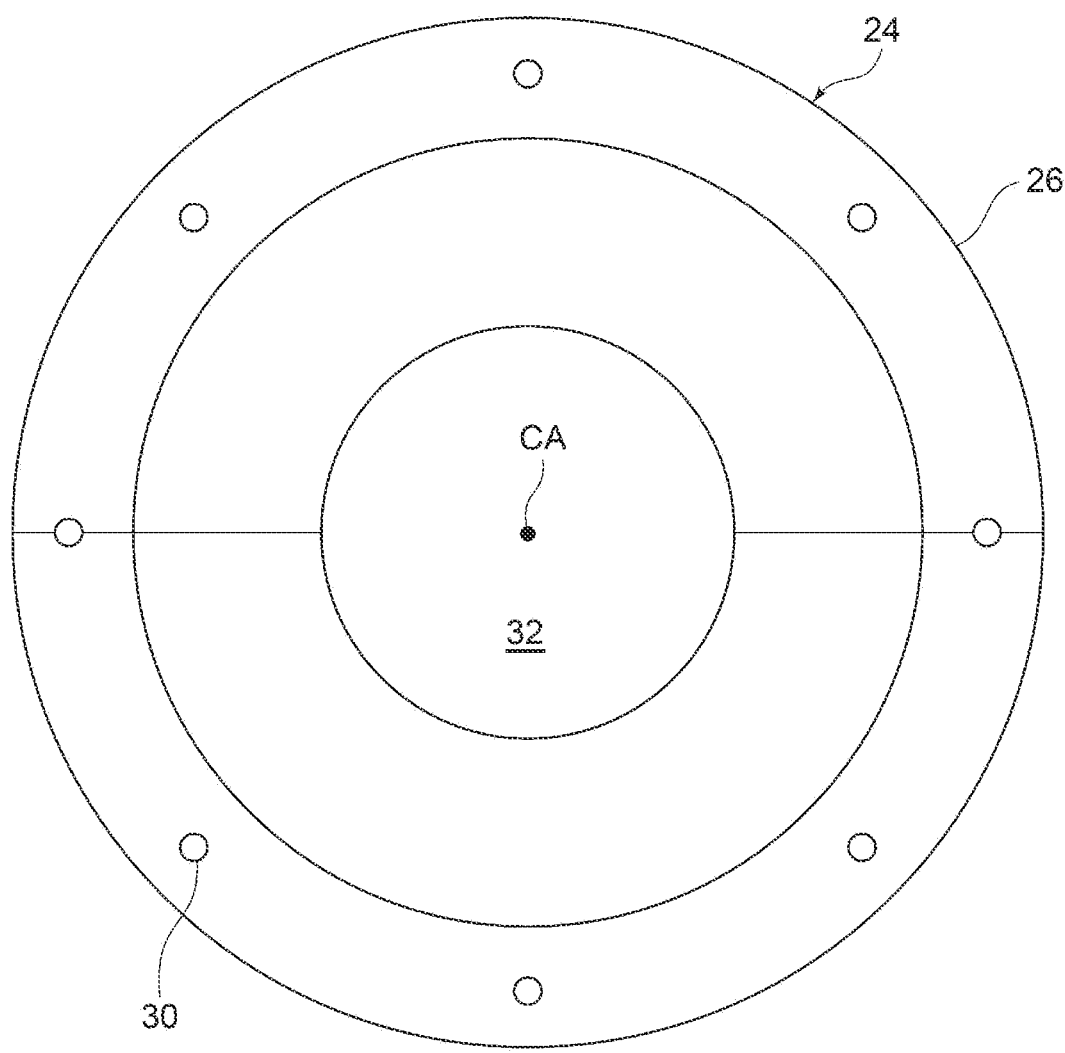
FIG. 2 is a front view of a weight attaching plate according to an embodiment.

In an embodiment, as shown in FIG. 2, the weight attaching plate 24 is made of a circular plate-like body and made of, for example, a rigid material.

In an embodiment, as shown in FIG. 2, the weight attaching portion 26 formed on the weight attaching plate 24 has a plurality of through holes 30 formed at intervals in the circumferential direction on the outer circumferential side of the primary outer ring member 14 and the secondary outer ring member 20. According to the present embodiment, by selecting the through hole 30 among the plurality of through holes 30 mounted with the additional weight 28, it is possible to adjust the torsional natural frequency of the coupling device 10 (10A), as well as by adjusting the mass and the number of additional weights 28 attached to the plurality of through holes 30, it is possible to finely adjust the natural torsional frequency.

The additional weight 28 is made of, for example, a small-diameter metal disc, and is fixed to the weight attaching portion 26 by a attaching means such as a bolt 34 inserted into the through hole 30. The additional weight 28 is appropriately selected and attached to one side or both sides of the plate-shaped weight attaching plate 24. By thus adjusting the individual shape, mass, and number of additional weights 28 attached to the weight attaching portion 26, it is possible to finely adjust the torsional natural frequency of the coupling device 10 (10A), and it is possible to expand the degree of freedom of the adjustment.

The attaching means for the additional weight 28 is not limited to the bolt. For example, the additional weight 28 may be fixed by inserting a pin or the like into the through hole 30. Alternatively, a fitting portion where the additional weight 28 is fitted may be formed in the weight attaching portion 26, and the additional weight 28 may be fitted into the fitting portion.

In an embodiment, the through holes 30 are formed at equal intervals in the circumferential direction of the weight attaching plate 24. Then, the additional weight 28 is attached to the through hole 30 located at a position symmetrical to a center point of the weight attaching plate 24 through which a rotational axis CA passes. Thus, it is possible to suppress generation of a vibration due to imbalance of the mass of the additional weight 28 with respect to the center point.

In an embodiment, as shown in FIG. 2, the weight attaching plate 24 has a through hole 32 formed at the radial center. Thus, it is possible to reduce the mass of the weight attaching plate itself. In an embodiment, the weight attaching plate 24 is divided into a plurality of parts and formed in the circumferential direction. Thus, the weight attaching plate 24 is easily attached. In the exemplary embodiment shown in FIG. 2, the weight attaching plate 24 is divided into two in the circumferential direction.

Figure 3:
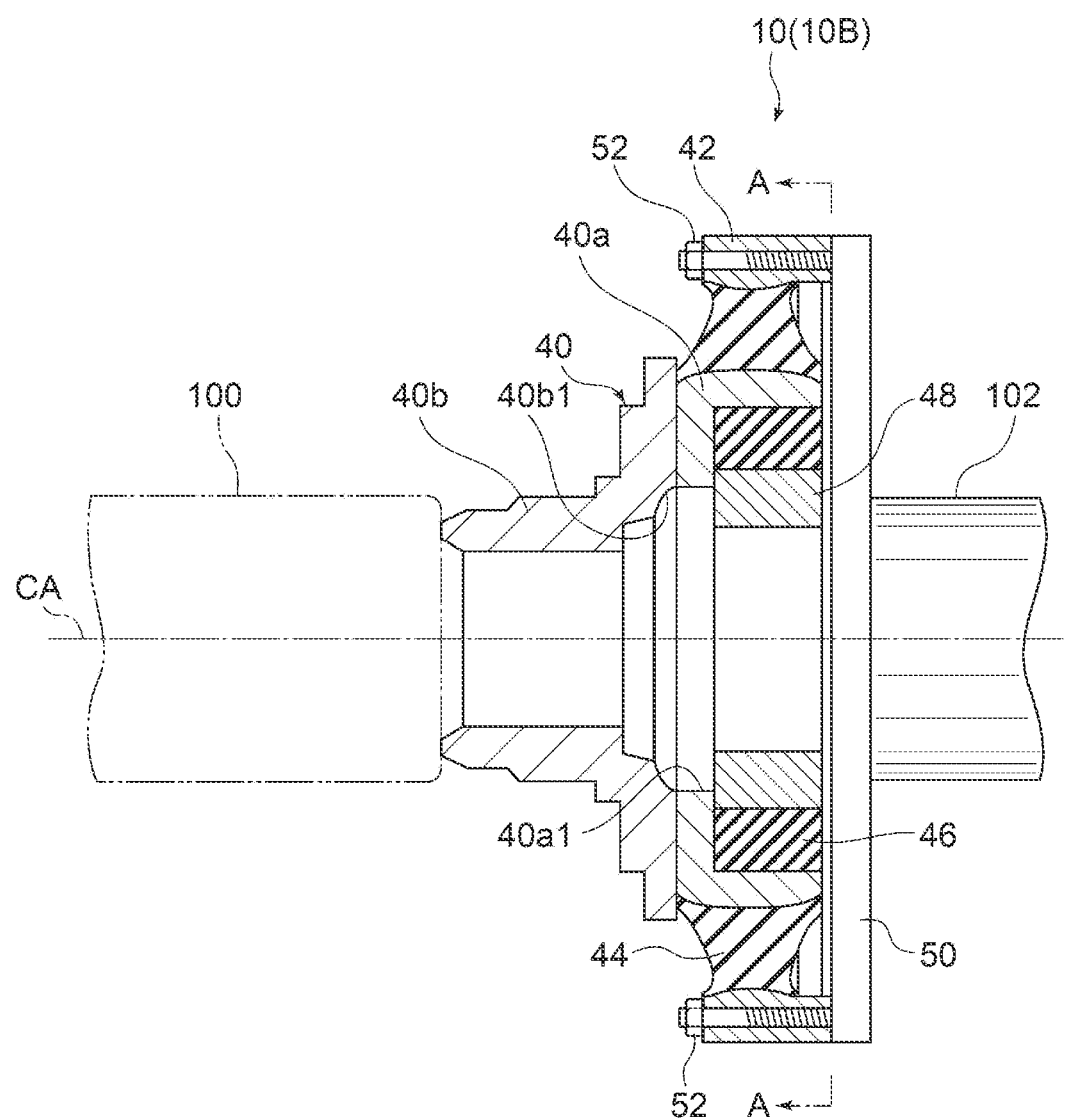
FIG. 3 is a front cross-sectional view of a coupling device according to an embodiment.
Figure 4:
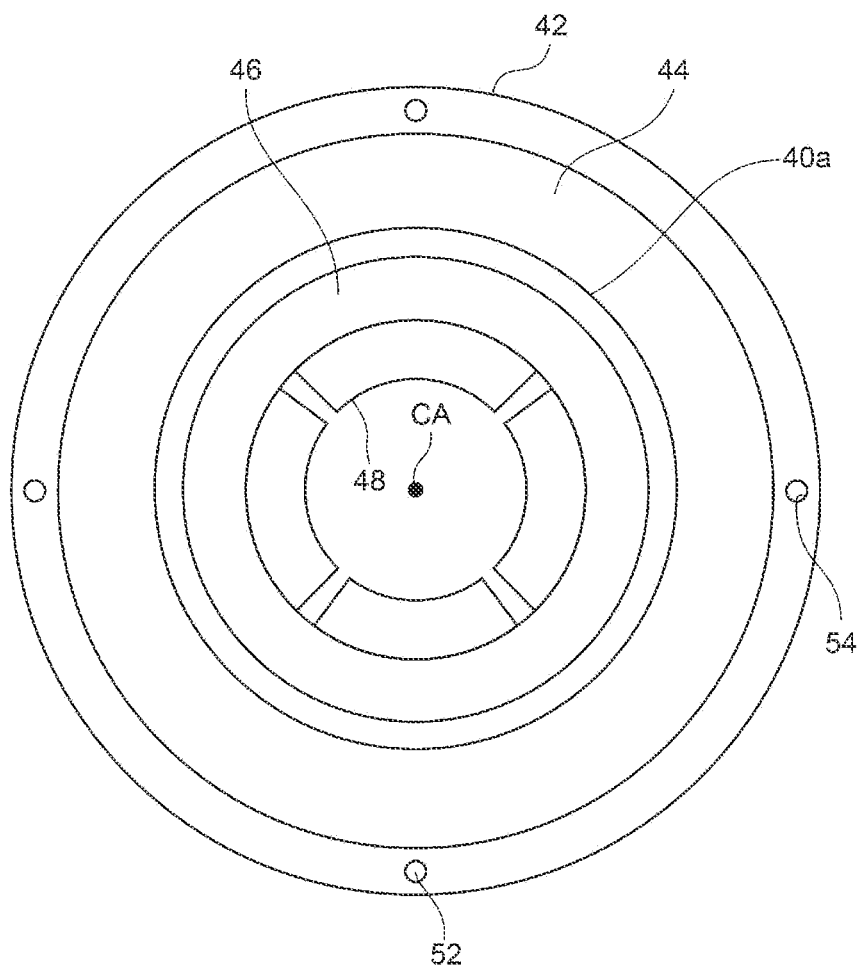
FIG. 4 is an arrow view taken along a line A-A in FIG. 3.

FIG. 3 is a cross-sectional view of the coupling device 10 (10B) for connecting the first shaft 100 and the second shaft 102 according to another embodiment. FIG. 4 is an arrow view taken along a line A-A in FIG. 3. In the coupling device 10 (10B), an inner ring member 40 is mounted on the first shaft 100, and an outer ring member 42 is mounted on the second shaft 102. The outer ring member 42 is disposed on an outer circumferential side of the inner ring member 40, and the inner ring member 40 and the outer ring member 42 are connected by an elastic member 44 disposed between these members 40 and 42. Further, an inner elastic body 46 is mounted on an inner circumferential side of the inner ring member 40, and an additional weight 48 is attached to an inner circumferential side of the inner elastic body 46. The additional weight 48 is detachably supported by the inner elastic body 46.

The torsional natural frequency of the coupling device 10 (10B) can be adjusted by adjusting the mass or the number of additional weights 48 attached to the inner circumferential side of the inner elastic body 46. Thus, when the natural torsional frequency of the first shaft 100 or the second shaft 102 and the natural torsional frequency of the coupling device 10 (10B) are close to each other and the resonance phenomenon may occur, by adjusting the mass of the additional weight 48 attached to the inner elastic body 46, the torsional natural frequency of the coupling device 10 (10B) is changed, making it possible to suppress the occurrence of the resonance phenomenon.

In the coupling device 10 (10B), the side of the first shaft 100 and the side of the second shaft 102 are connected via the elastic member 44, and the additional weight 48 is also connected to the inner ring member 40 via the inner elastic body 46. Therefore, the vibration generated in the shaft system is absorbed by the elastic member 44 and the inner elastic body 46, as well as the vibration of the shaft system is damped and transmitted to the additional weight 48. Therefore, no excessive stress is generated even if the resonance occurs in the shaft system, making it possible to suppress the damage to the shaft system. Further, by changing the support rigidity of the inner elastic body 46, it is possible to expand the adjustment range of the torsional natural frequency. In this case, it is possible to change the support rigidity by, for example, changing the inner elastic body 46 to a material having a different hardness, Young's modulus, or the like. Further, since the additional weight 48 is disposed on the inner circumferential side of the inner elastic body 46, allowing for downsizing and requiring no attaching space on the outer circumferential side of the coupling device 10 (10B).

In an embodiment, as shown in FIG. 3, the inner elastic body 46 is composed of an annular member mounted on an inner circumferential surface of the inner ring member 40. Thus, since the inner elastic body 46 is made of the annular member, mounting on the inner circumferential surface of the inner ring member 40 is easy, and the space for the mounting can be reduced. Further, the additional weight 48 is constituted by a plurality of additional weights on the inner circumferential side of the inner elastic body 46, which is an annular member, along the circumferential direction of the inner elastic body 46. In the present example, the plurality of additional weights are attached easily. Thus, the individual mass or number of plurality of additional weights is adjusted easily.

Further, as shown in FIG. 4, the additional weight 48 is formed by a plurality of rod-shaped bodies, each of which has an arc face along the inner circumferential surface of the inner elastic body 46 formed by the annular member, making it possible to compactly house the plurality of rod-shaped bodies in the inner elastic body 46. Various methods can be adopted for a method for attaching the additional weight 48 to the inner elastic body 46. For example, the additional weight 48 may be fixed with an adhesive agent, or the additional weight 48 may be attached with a pin or the like.

In an embodiment, as shown in FIG. 3, the inner ring member 40 includes a large diameter portion 40a and a small diameter portion 40b, the large diameter portion 40a includes a flange portion 40a1 extending radially inward at the axially one end, and the small diameter portion 40b includes a flange portion 40b1 extending radially outward at the axially one end. The flange portion 40a1 and the flange portion 40b1 are connected by a connecting means such as a bolt (not shown). An axially another end of the small diameter portion 40b is connected to the first shaft 100. The outer ring member 42 is connected to a coupling plate 50 by means such as a bolt (not shown), and a center of an opposite surface of the coupling plate 50 is connected to the second shaft 102.

In the exemplary embodiments shown in FIGS. 3 and 4, the outer ring member 42 having a bottomless cylindrical shape includes a bolt 52 which is screwed in a screw hole 54 axially formed. If the large diameter portion 40a of the inner ring member 40 and the additional weight 48 come into contact with the coupling plate 50, vibration absorption capacities of the elastic member 44 and the inner elastic body 46 are reduced. Thus, by adjusting the amount of protrusion of the bolt 52 protruding from the outer ring member 42 to the side of the coupling plate 50, it is possible to form a gap between the coupling plate 50, and the large diameter portion 40a and the additional weight 48.

Figure 5A:
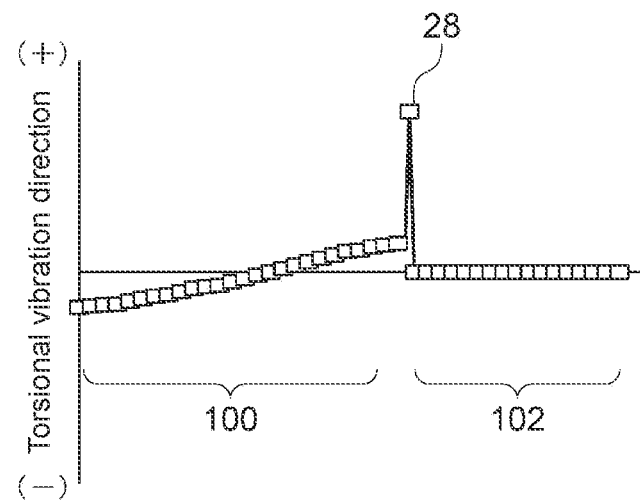
FIG. 5A is a view for describing a state of a torsional vibration of an axiality including the coupling device.
Figure 5B:
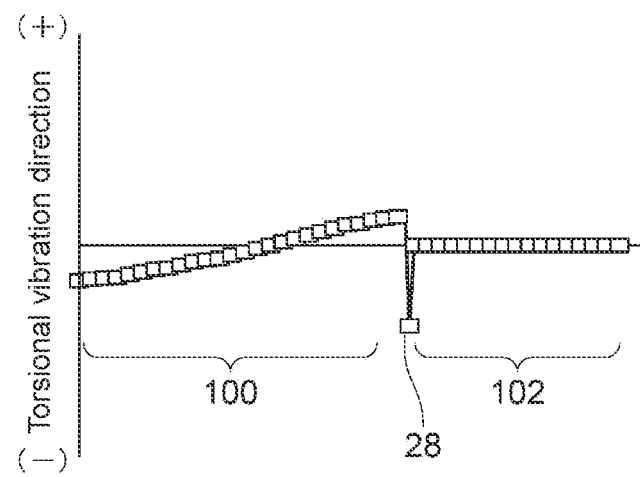
FIG. 5B is a view for describing a state of the torsional vibration of the axiality including the coupling device.

FIGS. 5A and 5B are each an explanatory view showing a torsional vibration state of the shaft system including the first shaft 100, the second shaft 102, and the weight attaching plate 24. FIG. 5A shows a case where a direction of the torsional vibration of the first shaft 100 and a direction in which an inertial force due to a load of the additional weight 28 is applied are the same, and FIG. 5B shows a case where the direction of the torsional vibration of the first shaft 100 and the direction in which the inertial force of the additional weight 28 is applied are opposite.

Figure 6:
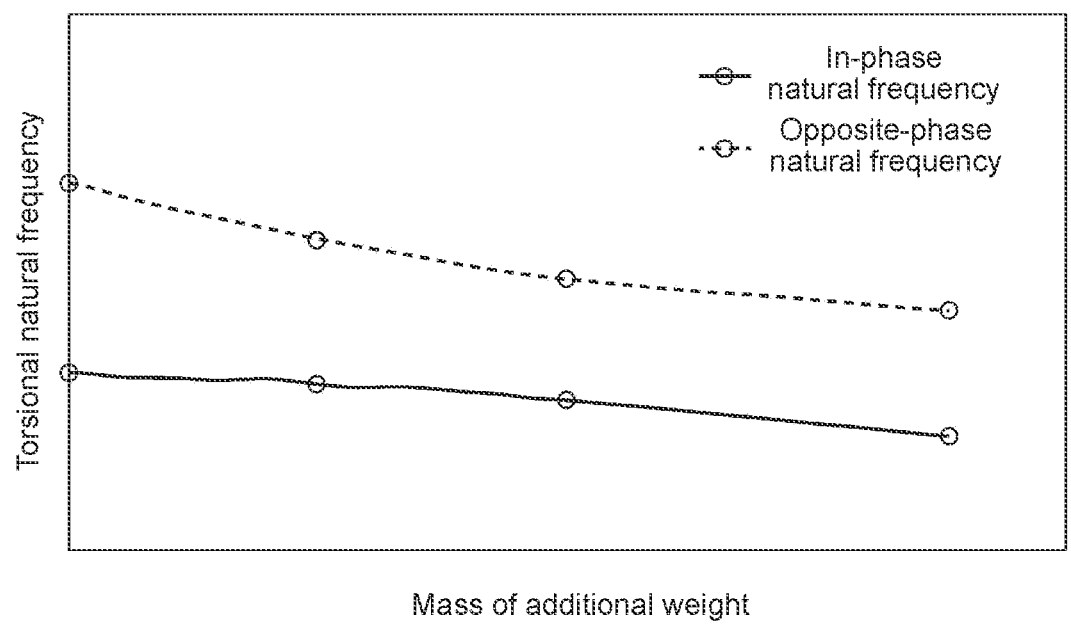
FIG. 6 is a graph showing a relationship between a natural torsional frequency and the mass of an additional weight.

If the torsional natural frequency of the coupling device 10 is brought close to the torsional natural frequency of the first shaft 100 by the adjustment means according to the above embodiment, as shown in FIG. 6, the torsional natural frequencies of the both become combined two torsional natural frequencies, that is, an in-phase natural frequency and an opposite-phase natural frequency shown in FIG. 6. The natural frequencies of these two vibration modes depend on proximity of the natural torsional frequency of the shaft in the case without the weight attaching plate 24 and the natural torsional frequency determined only by the elastic members 16, 22 and the weight attaching plate 24, the mass of the additional weight 28, and others. Thus, by adjusting the mass of the additional weight 28, it is possible to adjust the natural torsional frequency of the coupling device 10 to a frequency that can avoid the resonance with the natural torsional frequency of the first shaft 100.

For example, when the first shaft 100 is the crank shaft of the internal combustion engine, the frequency of a torque fluctuation generated from the internal combustion engine is generally an integral multiple of the rotation speed or half thereof. If a natural torsional frequency of a crank shaft system is close to the frequency of the torque fluctuation, it is possible to avoid the resonance by performing appropriate tuning using the above-described dependence.

Figure 7:
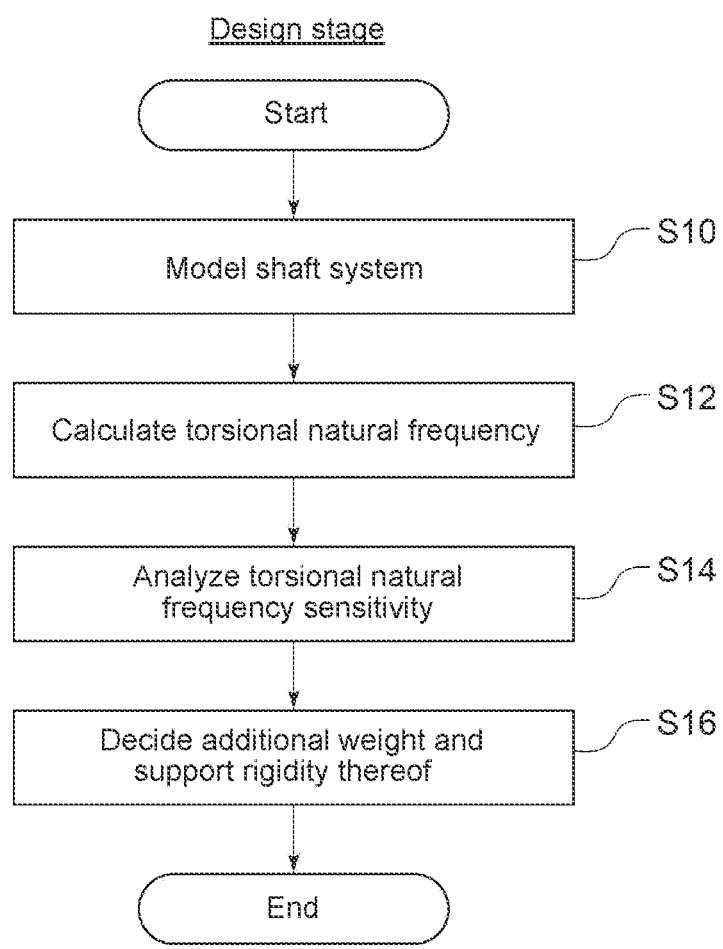
FIG. 7 is a flowchart of a torsional natural frequency adjustment method in a design stage of a shaft system according to an embodiment.

FIG. 7 is a flowchart of a torsional natural frequency adjustment method according to an embodiment. The torsional natural frequency adjustment method adjusts the torsional natural frequency of the coupling device 10 alone in the shaft system including the first shaft 100, the second shaft 102, and the above-described coupling device 10 (10A, 10B), suppressing the occurrence of the resonance phenomenon in the shaft system.

As shown in FIG. 7, in a design stage of the coupling device 10 (10A, 10B), first, an analysis model of the shaft system is created from a design drawing (step S10). From the created analysis model, the torsional natural frequency of the coupling device 10 is calculated (step S12). Next, the mass of the additional weight 28, 48 of the coupling device 10 (10A, 10B) and the support rigidity of the weight attaching plate 24 of the coupling device 10 (10A) or the inner ring member 40 of the coupling device 10 (10B) are, respectively, used as parameters to analyze how much the torsional natural frequency changes from the calculated torsional natural frequency (step S14). From the analysis result in step S14, the coupling device 10 (10A) decides specifications of the additional weight 28 and the weight attaching plate 24, and the coupling device 10 (10B) decides specifications of the support rigidities of the additional weight 48 and the inner ring member 40 (step S16). Thereafter, the coupling device 10 (10A, 10B) is incorporated into the first shaft 100 serving as the driving shaft and the second shaft 102 serving as the driven shaft according to the specifications decided in step S16, and a trial run is performed.

Figure 8:
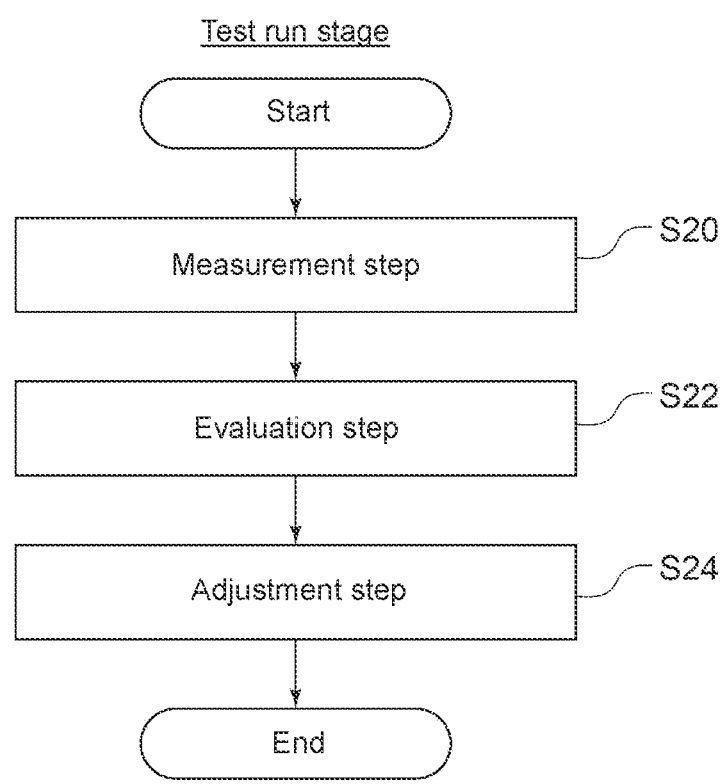
FIG. 8 is a flowchart of the torsional natural frequency adjustment method in a test run stage of the shaft system according to an embodiment.

In the trial run stage, as shown in FIG. 8, the torsional natural frequency of the shaft system, where the coupling device 10 (10A, 10B) is incorporated into the first shaft 100 and the second shaft 102, is measured (measurement step S20). In an evaluation step S22, the resonance state of the shaft system is evaluated based on the measurement result. That is, the torsional natural frequency is estimated with reference to the analysis result which is obtained at the time of design from the data obtained during the test run. A next adjustment step S24 includes obtaining a required change amount of the torsional natural frequency for avoiding the occurrence of the resonance phenomenon, from the torsional natural frequency estimated in the evaluation step S22. Then, the mass or the number of additional weights 28, 48 is adjusted to acquire the required change amount obtained. Further, the coupling device 10 (10A) adjusts the support rigidity of the weight attaching plate 24, and the coupling device 10 (10B) adjusts the support rigidity of the inner elastic body 46. Thus, it is possible to accurately avoid the occurrence of the resonance phenomenon of the shaft system.

The contents described in the above embodiments would be understood as follows, for instance.

1) A coupling device according to an aspect is a coupling device (10 (10A)) for connecting a first shaft (100) and a second shaft (102) that includes a primary inner ring member (12) mounted on the first shaft, a primary outer ring member (14) disposed on an outer circumferential side of the primary inner ring member, a primary elastic member (16) for connecting the primary inner ring member and the primary outer ring member, a secondary inner ring member (18) mounted on the second shaft, a secondary outer ring member (20) disposed on an outer circumferential side of the secondary inner ring member, a secondary elastic member (22) for connecting the secondary inner ring member and the secondary outer ring member, and a weight attaching plate (24) interposed between the primary outer ring member and the secondary outer ring member, the weight attaching plate including a weight attaching portion (26) capable of attaching and detaching an additional weight (28) to and from the outer circumferential side of the primary outer ring member and the outer circumferential side of the secondary outer ring member.

With such configuration, the first shaft side and the second shaft side are respectively connected via the primary elastic member and the secondary elastic member, and the weight attaching plate is also connected to the first shaft side and the second shaft side via the primary elastic member and the secondary elastic member, respectively. Thus, the vibration generated in the shaft system is absorbed by the primary elastic member and the secondary elastic member, as well as the vibration of the shaft system is damped and transmitted to the weight attaching plate. Therefore, no excessive stress is generated even if the resonance occurs in the shaft system, making it possible to suppress the damage to the shaft system. Further, since the weight attaching portion of the weight attaching plate is located on the outer circumferential side of the outer ring member, the additional weight is easily attached and detached without disassembling the coupling device, facilitating adjustment of the natural torsional frequency. Further, the additional weight is disposed at the position radially away from the rotational axis of the shaft system, making it possible to generate large torque even if the mass of the additional weight is small. Thus, it is possible to expand the adjustment range of the torsional natural frequency of the coupling device.

2) The coupling device according another aspect is the coupling device (10 (10A)) defined in 1), where the weight attaching portion has a plurality of through holes (30) formed at intervals in a circumferential direction on the outer circumferential side of the primary outer ring member and the outer circumferential side of the secondary outer ring member.

With such configuration, by attaching and detaching the additional weight to and from the above-described plurality of through holes, it is possible to adjust the torsional natural frequency of the coupling device, as well as by adjusting the mass and the number of additional weights attached to the plurality of through holes, it is possible to finely adjust the natural torsional frequency.

3) In order to achieve the above object, a coupling device according to still another aspect is a coupling device (10 (10B)) for connecting a first shaft (100) and a second shaft (102) that includes an inner ring member (40) mounted on the first shaft, an outer ring member (42) mounted on the second shaft, the outer ring member being disposed on an outer circumferential side of the inner ring member, an elastic member (44) for connecting the inner ring member and the outer ring member, an inner elastic body (46) mounted on an inner circumferential side of the inner ring member, and an additional weight (48) detachably supported by the inner elastic body on an inner circumferential side of the inner elastic body.

With such configuration, the first shaft side and the second shaft side are connected via the above-described elastic member, and the additional weight is also connected to the inner ring member via the above-described inner elastic body. Thus, the vibration generated in the shaft system is absorbed by the elastic member and the inner elastic member, as well as the vibration of the shaft system is damped and transmitted to the additional weight. Therefore, no excessive stress is generated even if the resonance occurs in the shaft system, making it possible to suppress the damage to the shaft system. Further, by changing the support rigidity of the inner elastic body, it is possible to expand the adjustment range of the torsional natural frequency. Further, since the additional weight is disposed on the inner circumferential side of the inner elastic body, allowing for downsizing and requiring no attaching space on the outer circumferential side of the coupling device.

4) The coupling device according to yet another aspect is the coupling device (10 (10B)) defined in 3), where the inner elastic body (46) is composed of an annular member mounted on an inner circumferential surface of the inner ring member (40).

With such configuration, since the inner elastic body is composed of the annular member, mounting on the inner circumferential surface of the inner ring member is easy, and the space for the mounting can be reduced. Further, the additional weight is constituted by the plurality of additional weights on the inner circumferential side of the inner elastic body, which is the annular member, along the circumferential direction of the inner elastic body, and the plurality of additional weights are attached easily. Thus, the individual mass or number of plurality of additional weights is adjusted easily.

5) A torsional natural frequency adjustment method according to yet another aspect is a torsional natural frequency adjustment method for adjusting a torsional natural frequency of a shaft system including a first shaft (100), a second shaft (102), and the above-described coupling device (10 (10A, 10B)) that includes a measurement step (S20) of measuring the torsional natural frequency of the shaft system, an evaluation step (S22) of evaluating a resonance state of the shaft system based on a measurement result of the torsional natural frequency, and an adjustment step (S24) of adjusting the torsional natural frequency of the shaft system by attaching and detaching the additional weight (28, 48) according to an evaluation result of the resonance state.

With such configuration, since the resonance state is evaluated based on the measurement result of the torsional natural frequency of the shaft system and the torsional natural frequency of the shaft system is adjusted based on the evaluation result, it is possible to reliably avoid the resonance phenomenon of the shaft system.

REFERENCE SIGNS LIST 10 (10A, 10B) Coupling device
12 Primary inner ring member
12a Body
12a1 Flange portion
12b Bottom
14 Primary outer ring member
16 Primary elastic member
18 Secondary inner ring member
18a Body
18a1 Flange portion
18b Bottom
20 Secondary outer ring member
21b Nut
22 Secondary elastic member
24 Weight attaching plate
26 Weight attaching portion
28, 48 Additional weight
30, 32 Through hole
21a, 34, 52 Bolt
40 Inner ring member
40a Large diameter portion
40a1 Flange portion
40b Small diameter portion
40b1 Flange portion
42 Outer ring member
44 Elastic member
46 Inner elastic body
50 Coupling plate
54 Screw hole
100 First shaft
102 Second shaft
CA Rotational axis

The invention claimed is:

1. A coupling device for connecting a first shaft and a second shaft, comprising:
   a primary inner ring member mounted on the first shaft;
   a primary outer ring member disposed on an outer circumferential side of the primary inner ring member;
   a primary elastic member for connecting the primary inner ring member and the primary outer ring member;
   a secondary inner ring member mounted on the second shaft;
   a secondary outer ring member disposed on an outer circumferential side of the secondary inner ring member;
   a secondary elastic member for connecting the secondary inner ring member and the secondary outer ring member; and
   a weight attaching plate interposed between the primary outer ring member and the secondary outer ring member, the weight attaching plate including a weight attaching portion capable of attaching and detaching an additional weight to and from the outer circumferential side of the primary outer ring member and the outer circumferential side of the secondary outer ring member, and being formed in a plate shape extending in a radial direction of the coupling device between the primary inner ring member and the secondary inner ring member.

2. The coupling device according to claim 1, wherein the weight attaching portion has a plurality of through holes formed at intervals in a circumferential direction on the outer circumferential side of the primary outer ring member and the outer circumferential side of the secondary outer ring member.

3. A torsional natural frequency adjustment method for adjusting a torsional natural frequency of a shaft system including a first shaft, a second shaft, and the coupling device according to claim 1, comprising:
   a measurement step of measuring the torsional natural frequency of the shaft system;
   an evaluation step of evaluating a resonance state of the shaft system based on a measurement result of the torsional natural frequency; and
   an adjustment step of adjusting the torsional natural frequency of the shaft system by attaching and detaching the additional weight according to an evaluation result of the resonance state.

4. The coupling device according to claim 1, wherein the primary inner ring member includes a first body, which includes a first flange portion extending in the radial direction, at an axially one end of a first cylindrical portion, and a first bottom fixed to the first flange portion, and
wherein the primary inner ring member includes a second body, which includes a second flange portion extending in the radial direction, at an axially one end of a second cylindrical portion, and a second bottom fixed to the second flange portion.

* * * * *